US009906939B1

(12) United States Patent
Feeney et al.

(10) Patent No.: US 9,906,939 B1
(45) Date of Patent: Feb. 27, 2018

(54) DETECTION OF NEARBY POINTS OF INTEREST

(71) Applicant: CISCO TECHNOLOGY, INC., San Jose, CA (US)

(72) Inventors: Martin Bernard Feeney, Galway (IE); Liam C. Frawley, Oranmore (IE); Niall McDonnell, Knocknacarra (IE)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/249,200

(22) Filed: Aug. 26, 2016

(51) Int. Cl.
| | | |
|---|---|---|
| *H04W 8/00* | (2009.01) | |
| *H04W 4/00* | (2009.01) | |
| *H04W 4/02* | (2009.01) | |
| *H04W 64/00* | (2009.01) | |
| *H04W 84/12* | (2009.01) | |
| *H04W 88/08* | (2009.01) | |

(52) U.S. Cl.
CPC ........... *H04W 8/005* (2013.01); *H04W 4/008* (2013.01); *H04W 4/023* (2013.01); *H04W 64/006* (2013.01); *H04W 84/12* (2013.01); *H04W 88/08* (2013.01)

(58) Field of Classification Search
CPC ..... H04W 4/02; H04W 64/00; H04W 64/006; H04W 4/023; H04W 4/04; H04W 4/025; G01S 5/14; G01S 13/84; G01S 17/42; G01S 1/08; G01S 5/06; G01C 22/00; G01C 21/206; H04M 1/72572
See application file for complete search history.

(56) References Cited

U.S. PATENT DOCUMENTS

| | | | |
|---|---|---|---|
| 6,314,365 B1 * | 11/2001 | Smith | ..................... G01C 21/30 340/988 |
| 2014/0236476 A1 * | 8/2014 | Khorashadi | .......... G01C 21/206 701/445 |
| 2015/0051829 A1 * | 2/2015 | Gearhart | .............. G01C 21/343 701/467 |

* cited by examiner

Primary Examiner — Nizar Sivji

(57) ABSTRACT

Particular embodiments described herein provide for a communication system that can be configured for receiving, at an electronic device, data related to one or more wireless access points visible to the electronic device, communicating the data related to the one or more wireless access points to a network element, and receiving an approximate distance to one or more points of interest from the electronic device.

17 Claims, 4 Drawing Sheets

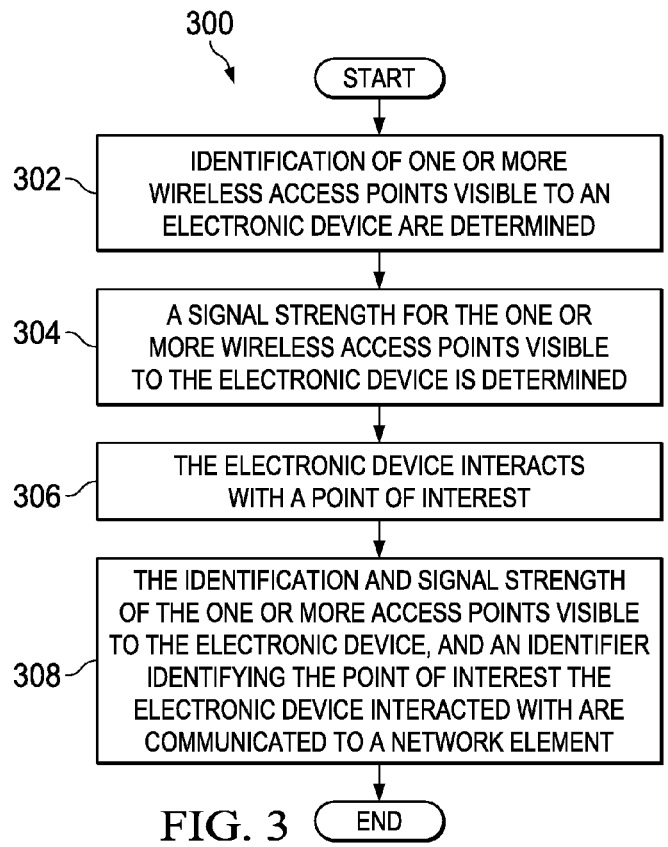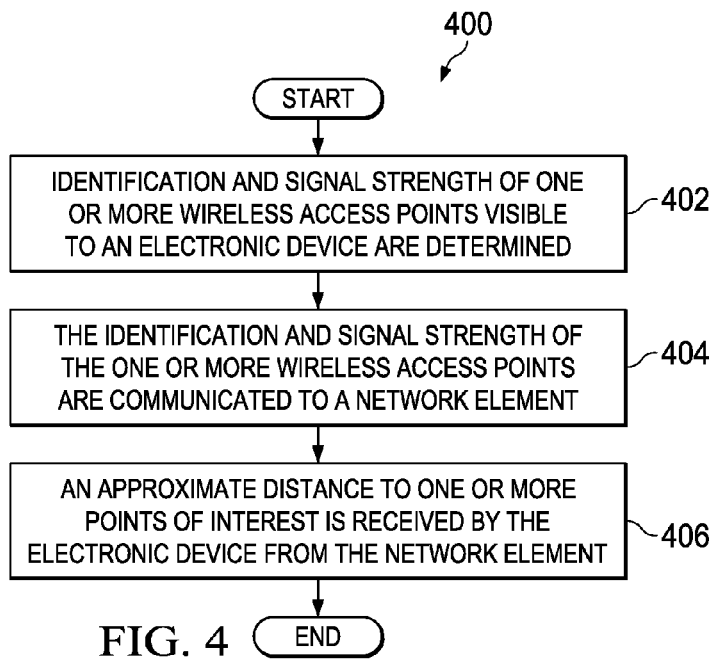

DETECTION OF NEARBY POINTS OF INTEREST

TECHNICAL FIELD

This disclosure relates in general to the field of communications and, more particularly, to the detection of nearby points of interest.

BACKGROUND

Often, a point of interest is coupled to or associated with a computer network. A computer network, sometimes referred to as a data network, can include a telecommunications network that allows computers to exchange data. Some computer networks include one or more wireless networks. A wireless network is any type of computer network that uses one or more wireless data connections for connecting network nodes, elements, or devices. For example, a wireless local area network (WLAN) links two or more devices over a relatively short distance using a wireless distribution method, usually providing a connection through an access point for Internet access. To be able to communicate over a wireless network, a device must first be connected to an access point. In some instances, the access point can be associated with one or more points of interest.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified flowchart illustrating potential operations that may be associated with the communication system in accordance with an embodiment;

FIG. 4 is a simplified flowchart illustrating potential operations that may be associated with the communication system in accordance with an embodiment.

The FIGURES of the drawings are not necessarily drawn to scale, as their dimensions can be varied considerably without departing from the scope of the present disclosure.

DETAILED DESCRIPTION OF EXAMPLE EMBODIMENTS

Overview

A method is provided in one example and includes a communication system configured to allow for the detection of nearby points of interest. In an illustrative example, an area can include points of interest and one or more wireless access points. Based on wireless signals from the wireless access points that are visible to an electronic device, an approximate distance between one or more points of interest and the electronic device can be determined.

In an implementation, a method is provided in one example and includes receiving, at an electronic device, data related to one or more wireless access points visible to the electronic device, communicating the data related to one or more wireless access points to a network element, and receiving an approximate distance to one or more points of interest from the electronic device. The data can include a unique identifier and a signal strength of each wireless access point visible to the electronic device. In some examples, the wireless access points visible to the electronic device are associated with one or more points of interest.

In an example, the data is communicated to a distance engine located in a network element such as a cloud network or a server. The communicated data can be compared with previously received data from other electronic devices to determine the approximate distance to each of the one or more points of interest from the electronic device. In one example, a root mean square algorithm is used to determine the approximate distance to each of the one or more point of interest from the electronic device. In a specific example, at least one of the one or more points of interest is a telepresence conference center.

Example Embodiments

Figure 1:
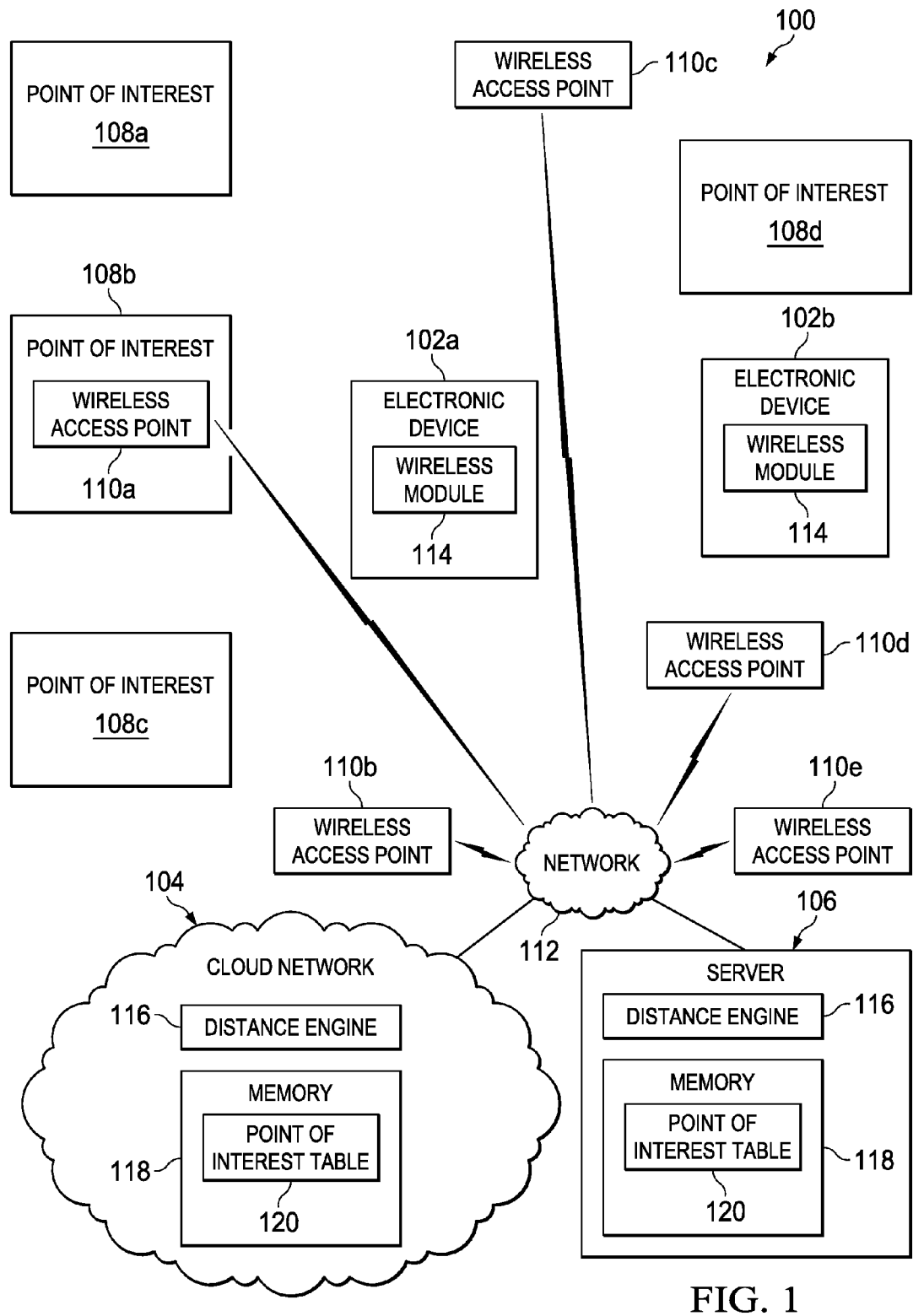
FIG. 1 is a simplified block diagram of a communication system for the detection of nearby points of interest in accordance with one embodiment of the present disclosure.

Turning to FIG. 1, FIG. 1 is a simplified block diagram of a communication system 100 for the detection of nearby points of interest in accordance with one embodiment of the present disclosure. Communication system 100 can include one or more electronic devices 102a and 102b, a cloud network 104, a server 106, one or more points of interest 108a-108d, and one or more wireless access points 110a-110e. Each electronic device 102a and 102b can include a wireless module 114. In an example, each point of interest 108a-108d has a known static physical location. Wireless module 114 can be configured to detect wireless signals from wireless access points 110a-110e. In an example, wireless access points 110a-110e are each WiFi access points. Cloud network 104 and server 106 can each include a distance engine 116 and memory 118. Memory 118 can include a point of interest table 120. Each electronic device 102a and 102b can be in communication with one or more wireless access points 110a-110e using wireless module 114. Each wireless access point 110a-110e can be in communication with cloud network 104 and server 106 using a network 112. In an example, each electronic device 102a and 102b can be in communication with cloud network 104 and server 106 using network 112.

Communication system 100 can be configured to automatically identify wireless access points (e.g., wireless access points 110a-110e) that are nearby or proximate to an electronic device (e.g., electronic device 102a) using data related to the wireless access points identified by or visible to the electronic device. More specifically, a distance engine in a network element can determine an approximate distance between the electronic device and a point of interest using the data related to the wireless access points visible to the electronic device. The approximate distance can be automatically sent to the electronic device and communed to a user. The term "automatically" can include instances where a user does not need to perform a specific action to cause an event or process to occur. For example, the electronic device does not need a user to perform searches, taps, clicks, keystrokes, etc. to determine nearby points of interest. As an example, in a building with a numbers of points of interest (e.g., points of interest 108a-108d), a user can be able to determine which point of interest are nearby. The information can be acquired without requiring the user to enter the point of interest, explicitly enable wireless (e.g., WiFi, Bluetooth, etc.) pairing, and without needing to manually search for the points of interest. In an example, each point of interest 108a-108d may be a telepresence meeting room, a point of sale (POS) terminal, a learning terminal such as at a museum, a gather or meeting point at a festival, concert, or other gathering or event, or some other physical location connected to a network that may be of interest to a user.

For purposes of illustrating certain example techniques of communication system 100, it is important to understand how typical communications may traverse the network. The following foundational information may be viewed as a basis from which the present disclosure may be properly explained.

When a user wants to interact or locate a point of interest, typically the user must use a map to locate the desired point of interest. For example, if a user needs to attend a telepresence conference in a specific telepresence room, the user must use a building map or ask a person for directions to locate the specific telepresence room. Also, if a user is at a conference, festive, museum, etc. and wants to visit a specific booth, attraction, or gather place, the user must use a map of the floor space or ask for directions to locate the booth, attraction, or gather place. Sometimes, the point of interest may be associated with a computer network that includes one or more wireless networks that provides a connection through an access point. It would be beneficial if a system and method could help the user locate the point of interest using one or more wireless access points.

A communication system, as outlined in FIG. 1, can resolve these issues (and others). Communication system 100 may be configured gather information related to wireless access points visible to an electronic device and use the data to help determine when the electronic device is near a specific point of interest. More specifically, communication system 100 can be configured to identify wireless access points (e.g., wireless access points 110a-110e) that are associated with a point of interest (e.g. point of interest 108a-108d) and automatically determine when an electronic device (e.g., electronic device 102a) is nearby or proximate to the points of interest.

In a specific example, the system and method can include two phases. In the first phase, when an electronic device (e.g., electronic device 102a) pairs with a wireless access point (e.g., wireless access point 110a) associated with a point of interest (e.g., point of interest 108b) data regarding the pairing can be communicated to a distance engine (e.g., distance engine 116). An electronic device can pair with a point of interest when the electronic device or a user of the electronic device interacts with the point of interest. For example, the electronic device or user may activate a function or feature associated with the point of interest or the electronic may connect (e.g., a physical connection or wireless connection) with the point of interest.

Data related to other wireless access points (e.g., wireless access points 110a-110e) visible to the electronic device can also be communicated to the distance engine. Some of the data communicated can include a unique identifier (e.g., media access control (MAC) address (e.g., BSSID), unique network identification, etc.) of each wireless access point visible to the electronic device, the signal strength of each wireless access point visible to the electronic device, and the unique identifier of the point of interest that the electronic device has paired with. In other examples, other data may be communicated to a distance engine (e.g., distance engine 116) to help the system determine the approximate distance between points of interests and the electronic device. In some examples, there is no attempt or need to store information about the actual electronic device. The distance engine can aggregate the data with previously received data and build a point of interest table (e.g., point of interest table 120) that can map a relationship between points of interest and visible signals from wireless access points. For example, each point of interest table entry can include a mean wireless signal strength of all the electronic devices that were aware of the wireless access point, a max signal strength, a minimum signal strength, standard deviation of signal strengths, number of electronic devices that reported the access point when engaged with the point of interest, etc. Using this data, communication system 100 can be configured to determine a location of one or more points of interests relative to an electronic device.

In a second phase, an electronic device can acquire data (e.g., signal strength, MAC address, etc.) related to each wireless access point visible to the electronic device. The electronic device can communicate the data to the distance engine and using the data related to each visible wireless access point, the distance engine can determine points of interest that are nearby the electronic device and/or an approximate distance between the electronic device and points of interest. In a specific example, the distance engine can use the data related to each access point visible to the electronic device and calculate a root mean square distance between the electronic device and one or more points of interest and communicate a list of nearby points of interest to the electronic device. In an example, the list of the points of interest can be ordered by those likely to be closest to the electronic device.

In a specific example, distance engine 116 has acquired the following data from prior coupling of electronic devices with a specific point of interest (e.g., point of interest 108a): point of interest 108a: {// wireless access point 110a is closest, wireless access point 110e farther away, wireless access point 110d weakest; wireless access point 110a {Max: −50 db, Mean: −65 dB, Min: −75 db, std Deviation: 3.0, Count: 4}; wireless access point 110b {Max: −70 db, Mean: −75 dB, Min: −80 db, std deviation: 3.0, Count: 3}; wireless access point 110c {Max: −80 db, Mean: −85 dB, Min: −90 db, std Deviation: 3.0, Count: 2}.}, etc. When electronic device 102a collects data related to the signal strength of each wireless access point visible to electronic device 102a and communicates the data distance engine 116, the data may include: wireless access point 110a: signal strength=−65, wireless access point 110b: signal strength=−70, wireless access point 110c: signal strength=−80, wireless access point 110d: signal; strength=−55. If data for wireless access point 110e was received, the data may be ignored if distance engine 116 does not have an entry related to wireless access point 110e for point of interest 108a.

Using the above data, distance engine 116 can calculate an approximate distance between electronic device 102a and a point of interest by squaring the difference between the signal strength of each wireless access point visible to electronic device 102a and the mean signal strength of each wireless access point visible to electronic device 102a, summing the differences, and calculating the square root of the result and dividing that by the number of signals. Applying an example algorithm to the above example, gives an approximate distance from point of interest 108b of $(sqrt((65-65)^2+(75-70)^2+(80-85)^2))/3$. In this example, an approximate distance of <=5 is calculated meaning that electronic device 102a is very close to point of interest 108b. The determined approximate distance can vary with the layout of the wireless access points and the above example is only provided for illustration purposes.

Distance engine 116 can be configured to determine one or more thresholds related to the detection of nearby points of interest. For example, distance engine 116 can determine a threshold related to each point of interest as it accumulates data from each successful pairing between a point of interest and an electronic device. If the amount of data related to a point of interest and an access point is low compared with the overall data for that point of interest and other access points, then the access point results are not included in the calculation of the approximate distance. Likewise, if the standard deviation at a point of interest and an access point pair is large, then the access point is not included in the calculation of the approximate distance from that point of interest.

In an example, distance engine 116 can be configured to determine distance thresholds and count thresholds. These, and other thresholds, can be used by distance engine to help ensure the use of data that has a relatively high level of confidence associated with the data. More specifically, if a specific wireless access point is present in fifty percent (50%) or less of the sets of data submitted after successful pairs for a point of interest, then the count threshold can be determined to have dropped below a threshold where the data related to the wireless access point is considered reliable. In such an example, the data may not be considered in distance calculations for that point of interest. However, the data for the wireless access point may still be collected. It should be noted that the 50% count threshold is for example purposes only and the threshold count can be configurable based on the environment, number or wireless access points visible around or near the point of interest, and other factors. For example, if there are a lot of access points associated with a point of interest, then the threshold may be as high as ninety percent (90%) or even ninety-five percent (95%) as there will likely be several wireless access points visible where one hundred percent (100%) of the time data related to the point of interest is submitted.

Similarly, if the signal strength of a specific wireless access point has a large variance for the point of interest (in an example, the variance can be recorded as the standard deviation of that signal), then it may not be considered very reliable either and may not be considered in distance calculations for the point of interest. In this example, the threshold can be a number that is compare to the standard deviation. For example, distance engine 116 may have recorded several signals for wireless access point 110a from various electronic devices 102a, 102b when they successfully interact with point of interest 108a. The average of the values may be −65 and the standard deviation of the values may be 3. This indicates that the majority of the submitted signal strength readings are in the range of −62 to −68 which is stable enough to have good confidence in the point of interest and WiFi access point pair. If the standard deviation was, for example, 10 then the majority of the values would be in the range −55 to −75 which is far less precise than the previous example, and readings from the WiFi access points for that point of interest would be treated as less confident or could be ignored entirely. If the standard deviation is greater than the predetermined threshold, the wireless access point is not included in distance calculations for that point of interest. The threshold may be configurable based on environment. Data can still be collected and if the variance decreases or if the threshold value is met (e.g., standard deviation is below or above a predetermined number such as 5) then data from the access point may be used in future calculations for that point of interest.

If a point of interest or an access point moves, the system needs to recalibrate data associated with the point of interest or access point that moved. The system can detect such a move when distance engine 116 receives pairing data inconsistent with its stored data. In this case, the system must clear its stored data for that point of interest or access point that moved.

Using the above example, communication system 100 can be configured to record the wireless signal strengths received by devices that pair or interact with a point of interest at a known static location, use this information to build the location of the point of interest in terms of the points of interest approximate distance from wireless access points, and use this information to determine when an electronic device is near a point of interest. The above examples are only illustrative examples and other means or methods may be used to detect points of interest near an electronic device.

Turning to the infrastructure of FIG. 1, communication system 100 in accordance with an example embodiment is shown. Generally, communication system 100 can be implemented in any type or topology of networks. Network 112 represents a series of points or nodes of interconnected communication paths for receiving and transmitting packets of information that propagate through communication system 100. Network 112 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Network 112 can include any number of hardware or software elements coupled to (and in communication with) each other through a communications medium.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication systems 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, cloud network 104, server 106, points of interest 108a-108d, and wireless access points 110a-110e, are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

As used herein in this Specification, the term 'network element' is meant to encompass any of the aforementioned elements, as well as servers (physical or virtually implemented on physical hardware), machines (physical or virtually implemented on physical hardware), end-user devices, routers, switches, cable boxes, gateways, bridges, load-balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the synonymous labels operations thereof. This may be inclusive of appropriate algorithms and communication protocols that allow for the effective exchange of data or information.

In one implementation, network elements implementing the detection of nearby points of interest in a network environment features described herein may include software to achieve (or to foster) the functions discussed herein for providing and processing when the software is executed on one or more processors to carry out the functions. This could include the implementation of instances of modules (e.g., distance engine 116) and/or any other suitable element that would foster the activities discussed herein. Additionally, each of these elements can have an internal structure (e.g., a processor, a memory element, etc.) to facilitate some of the operations described herein. In other embodiments, these functions for the detection of nearby points of interest may be executed externally to these elements, or included in some other network element to achieve the intended functionality. Alternatively, network elements may include software (or reciprocating software) that can coordinate with other network elements in order to achieve the detection of nearby points of interest functions described herein. In still other embodiments, one or several devices may include any suitable algorithms, hardware, software, components, modules, interfaces, or objects that facilitate the operations thereof.

In regards to the internal structure associated with communication system 100, electronic devices 102a-102b, cloud network 104, server 106, points of interest 108a-108d, and wireless access points 110a-110e can each include memory elements for storing information to be used in the operations outlined herein. Each of electronic devices 102a-102b, cloud network 104, server 106, points of interest 108a-108d, and wireless access points 110a-110e may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the detection of nearby points of interest functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein. In some of these instances, one or more memory elements can store data used for the operations described herein. This includes the memory element being able to store instructions (e.g., software, code, etc.) that are executed to carry out the activities described in this Specification. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the detection of nearby points of interest functions, as outlined herein. Additionally, each of these devices may include a processor that can execute software or an algorithm to perform the detection of nearby points of interest as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

In an example implementation, network elements of communication system 100 may include software modules (e.g., wireless module 114, distance engine 116, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, electronic devices 102a-102b, cloud network 104, server 106, points of interest 108a-108d, and wireless access points 110a-110e each may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Cloud network 104 may generally be defined as the use of computing resources that are delivered as a service over a network, such as the Internet. The services may be distributed and separated to provide required support for electronic devices. Typically, compute, storage, and network resources are offered in a cloud infrastructure, effectively shifting the workload from a local network to the cloud network. Server 106 can be a network element such as a physical server or virtual server and can be associated with clients, customers, endpoints, or end users wishing to initiate a communication in communication system 100 via some network (e.g., network 112). The term 'server' is inclusive of devices used to serve the requests of clients and/or perform some computational task on behalf of clients within communication systems 100.

Figure 2:
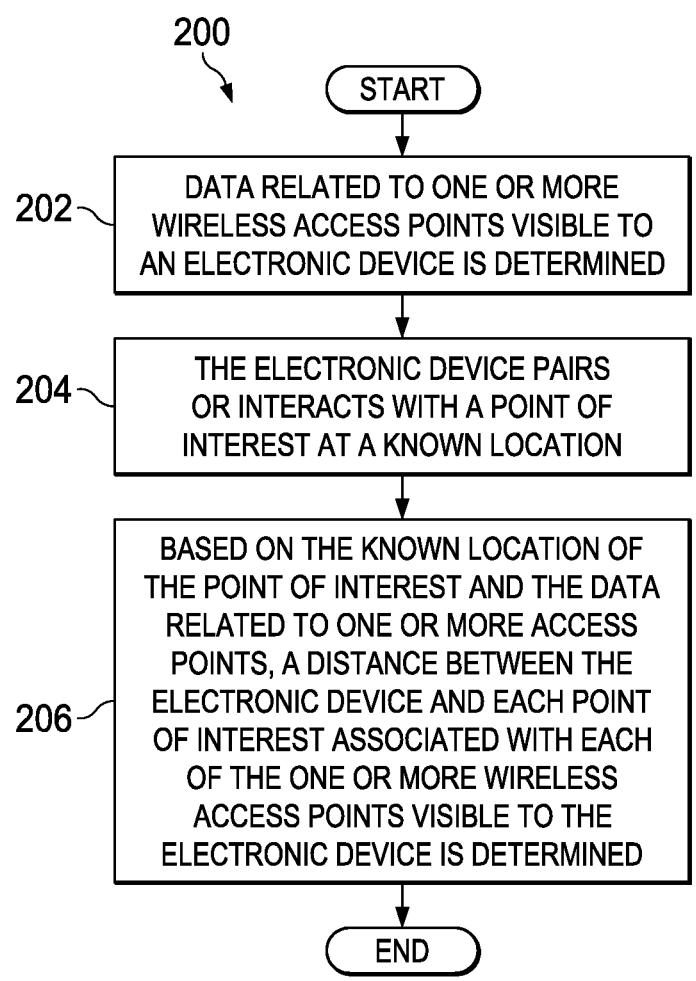
FIG. 2 is a simplified flowchart illustrating potential operations that may be associated with the communication system in accordance with an embodiment.

Turning to FIG. 2, FIG. 2 is an example flowchart illustrating possible operations of a flow 200 that may be associated with the detection of nearby points of interest, in accordance with an embodiment. In an embodiment, one or more operations of flow 200 may be performed by wireless module 114 and/or distance engine 116. At 202, data related to one or more wireless access points visible to an electronic device is determined. At 204, the electronic device pairs or interacts with a point of interest at a known location. At 206, based on the known location of the point of interest and the data related to one or more access points, a distance between the electronic device and each point of interest associated with each of the one or more wireless access point visible to the electronic device is determined. In an example, the data related to the one or more wireless access points visible to an electronic device can be used by a distance engine (e.g., distance engine 116) to determine a distance between the point of interest and other electronic devices that can detect the one or more wireless access points.

Turning to FIG. 3, FIG. 3 is an example flowchart illustrating possible operations of a flow 300 that may be associated with the detection of nearby points of interest, in accordance with an embodiment. In an embodiment, one or more operations of flow 300 may be performed by wireless module 114 and/or distance engine 116. At 302, identification of one or more wireless access points visible to an electronic device are determined. At 304, a signal strength for the one or more wireless access points visible to the electronic device is determined. At 306, the electronic device interacts with a point of interest. At 308, the identification and signal strength of the one or more access points visible to the electronic device and an identifier identifying the point of interest the electronic device interacted with are sent to a network element. Based on the known location of the point of interest, a second electronic device (e.g., electronic device 102b) can determine the identification and signal strength of the one or more access points visible to the second electronic device and the data can be used by a distance engine (e.g., distance engine 116) to determine an approximate distance between the second electronic device and the point of interest.

Turning to FIG. 4, FIG. 4 is an example flowchart illustrating possible operations of a flow 400 that may be associated with the detection of nearby points of interest, in accordance with an embodiment. In an embodiment, one or more operations of flow 400 may be performed by wireless module 114 and/or distance engine 116. At 402, identification and signal strength of one or more wireless access points visible to an electronic device are determined. At 404, the identification and signal strength of the one or more wireless access points are communicated to a network element. For example, the network element may be distance engine 116. At 406, an approximate distance to one or more points of interest is received by the electronic device from the network element. For example, distance engine 116 may determine an approximate distance to one or more points of interest from electronic device 102a and communicate the approximate distance to electronic device 102a.

Figure 5:
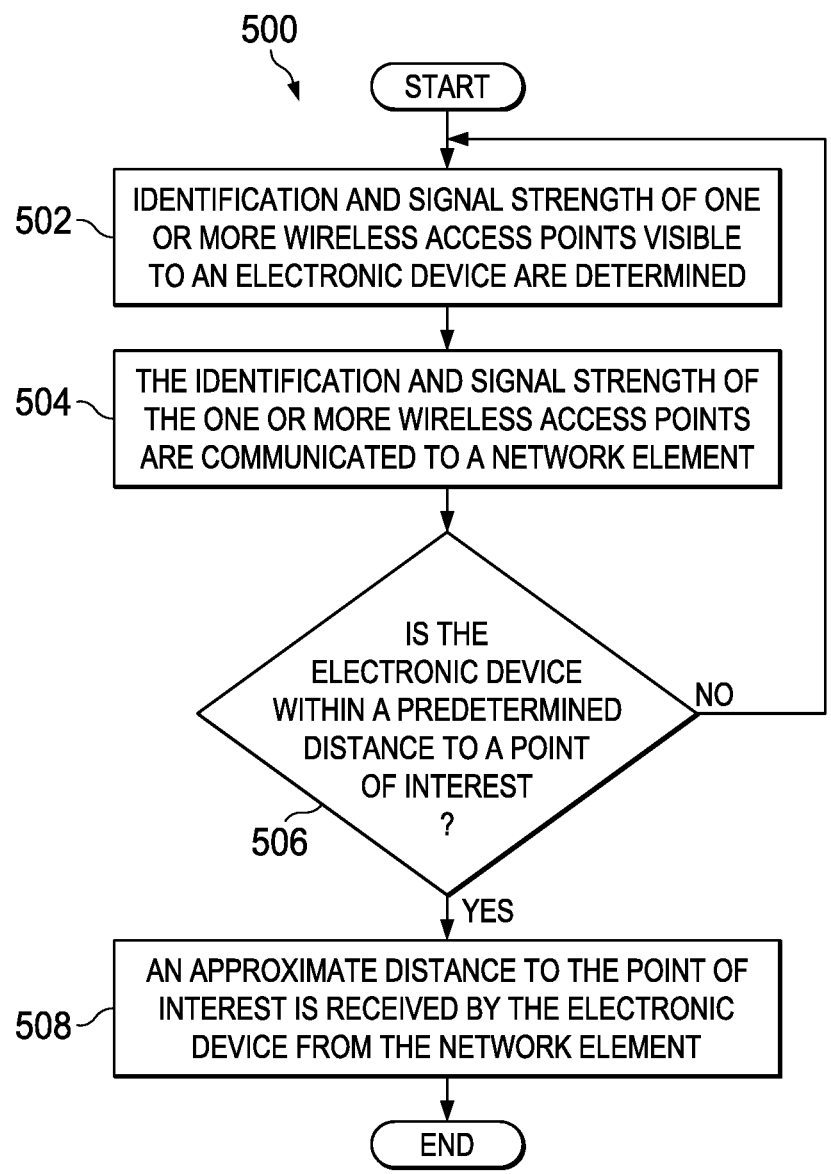
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with the detection of nearby points of interest, in accordance with an embodiment. In an embodiment, one or more operations of flow 500 may be performed by wireless module 114 and/or distance engine 116. At 502, identification and signal strength of one or more wireless access points visible to an electronic device are determined. At 504, the identification and signal strength of the one or more wireless access points are communicated to a network element. At 506, the system determines if the electronic device is within a predetermined distance to a point of interest. If the electronic devices is not within a predetermined distance to a point of interest (e.g., a threshold distance such as 50 feet, meters, or some other distance unit, 40 feet, meters, or some other distance unit, 35 feet, meters, or some other distance unit, 25 feet, meters, or some other distance unit, etc.), then identification and signal strength of one or more wireless access points visible to an electronic device are again determined, as in 502. In an example, the distance may not be a spatial distance measured in distance units. For example, the distance can be related to the difference in received signal to noise ratio of all relevant access points between an electronic device's current position and those same signal to noise ratios of the same access points that are visible near know points of interests. If the electronic device is within a predetermined distance to a point of interest, then an approximate distance to the point of interest is received by the electronic device from the network element, as in 508.

Note that in certain example implementations, the detection of nearby points of interest functions outlined herein may be implemented in logic encoded in one or more non-transitory media (e.g., embedded logic provided in an application specific integrated circuit (ASIC), digital signal processor (DSP) instructions, software (potentially inclusive of object code and source code) to be executed by a processor, or another similar machine, etc.). In some of these instances, a memory element can store data used for the operations described herein. This includes the memory element being able to store code (e.g., software, logic, processor instructions, etc.) that can be executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and its teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 has been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method performed in a network element, comprising:
    receiving, from an electronic device, data related to one or more wireless access points visible to the electronic device;
    determining an approximate distance between one or more points of interest and the electronic device, the approximate distance being based on the data, by comparing the data with previously received data related to one or more wireless access points from other electronic devices, and when the data is determined to be below a threshold, waiting for receipt of new data from the electronic device to determine the approximate distance between each of the one or more points of interest and the electronic device; and
    sending the approximate distance to the electronic device.

2. The method of claim 1, wherein the data includes a unique identifier and a signal strength for each wireless access point visible to the electronic device.

3. The method of claim 1, wherein at least one of the one or more wireless access points visible to the electronic device is associated with a specific point of interest.

4. The method of claim 1, wherein the data is received at a distance engine associated with the network element.

5. The method of claim 1, wherein a root mean square algorithm is used to determine the approximate distance between each of the one or more points of interest and the electronic device.

6. The method of claim 1, wherein at least one of the one or more points of interest is a telepresence conference center.

7. Logic encoded in one or more non-transitory tangible media that includes code for execution and when executed by a processor, operable to perform operations comprising:
    receiving, from an electronic device, data related to one or more wireless access points visible to the electronic device;
    determining an approximate distance between one or more points of interest and the electronic device, the approximate distance being based on the data, by comparing the data with previously received data related to one or more wireless access points from other electronic devices, and when the data is determined to be below a threshold, waiting for receipt of new data from the electronic device to determine the approximate distance between each of the one or more points of interest and the electronic device; and
    sending the approximate distance to the electronic device.

8. The logic of claim 7, wherein the data includes a unique identifier and a signal strength for each wireless access point visible to the electronic device.

9. The logic of claim 7, wherein at least one of the one or more wireless access points visible to the electronic device is associated with a specific point of interest.

10. The logic of claim 7, wherein the data is received at a distance engine associated with a network element.

11. The logic of claim 7, wherein a root mean square algorithm is used to determine the approximate distance between each of the one or more points of interest and the electronic device.

12. An apparatus, comprising:
 a memory element configured to store data,
 a processor operable to execute instructions associated with the data, and
 a wireless module configured for:
  receiving, from an electronic device, data related to one or more wireless access points visible to the electronic device;
  determining an approximate distance between one or more points of interest and the electronic device, the approximate distance being based on the data, by comparing the data with previously received data related to one or more wireless access points from other electronic devices, and when the data is determined to be below a threshold, waiting for receipt of new data from the electronic device to determine the approximate distance between each of the one or more points of interest and the electronic device; and
  sending the approximate distance to the electronic device.

13. The electronic device of claim 12, wherein the data includes a unique identifier and a signal strength for each wireless access point visible to the electronic device.

14. The electronic device of claim 12, wherein at least one of the one or more wireless access points visible to the electronic device is associated with a specific point of interest.

15. The electronic device of claim 12, wherein the data is received at a distance engine associated with a network element.

16. The electronic device of claim 12, wherein a root mean square algorithm is used to determine the approximate distance between each of the one or more points of interest and the electronic device.

17. The electronic device of claim 12, wherein at least one of the one or more points of interest is a telepresence conference center.

\* \* \* \* \*